Patented June 29, 1943

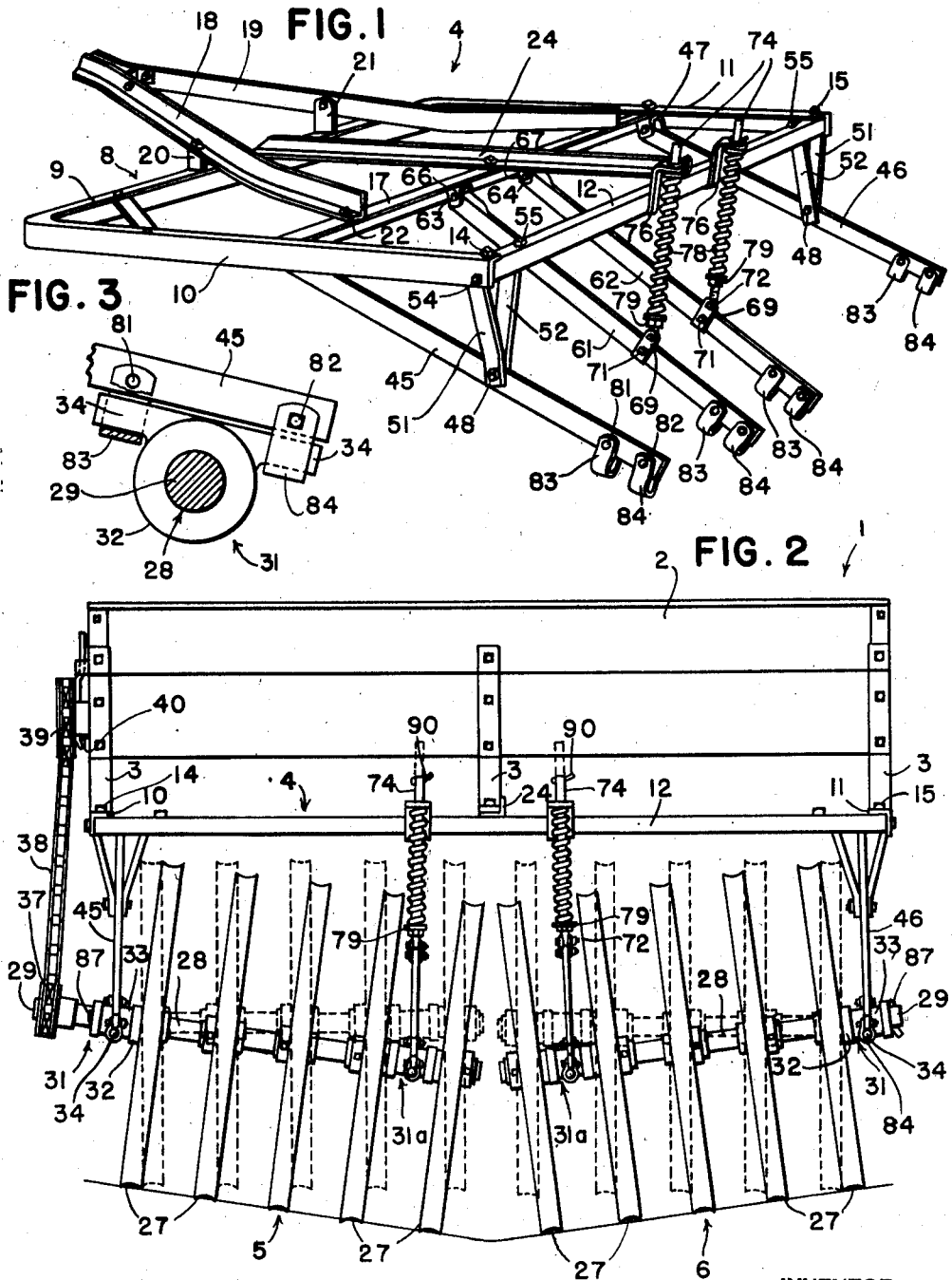

2,323,044

UNITED STATES PATENT OFFICE 2,323,044

GRAIN DRILL

William A. Hyland, Horicon, Wis., assignor to The Van Brunt Manufacturing Company, Horicon, Wis., a corporation of Wisconsin Application June 19, 1941, Serial No. 398,794

5 Claims. (Cl. 111—54)

The present invention relates generally to agricultural implements and more particularly to grain drills of the press wheel type in which a press wheel is provided behind each furrow opener for pressing the soil firmly and compactly about the seed deposited thereby.

Grain drills of the press wheel type are especially adapted for use in sections where the climate is dry and the soil is inclined to blow, or where the soil requires special care to retain the maximum amount of moisture for the growing crops, it being the object of providing a press wheel behind each furrow opener to secure a firm compacting of the soil about each seed and a uniform depth of planting so as to produce full even stands. Under certain conditions, a grain drill of this type may be used in combination with a plow and pulverizer so that with one trip over the field, the job of plowing, pulverizing and planting can be completed in the shortest possible time. It will be seen, therefore, that for best operation a drill of this type should be constructed so that the several wheels bear with uniform pressure against the ground, regardless of irregularities in the ground surface. Under certain conditions, as when the drill is connected back of a plow without an intervening pulverizer or packer, ground irregularities may be considerable.

The object and general nature of the present invention is, therefore, the provision of a new and improved construction for grain drills, particularly of the press wheel type, in which a plurality of press wheel units are connected with the frame in such a manner as to yield when passing over obstructions and other ground irregularities but in which the connection between the press wheel units and the drill frame is relatively simple and inexpensive. More specifically, it is a feature of this invention to provide a flexible connection between the press wheel units and the drill frame to accommodate the press wheels following the contour of the ground but without the employment of excessive linkage, evener bars and other extraneous parts which unnecessarily increase the complication and cost of manufacture of the implement. Further, it is a feature of this invention to provide a drill in which one end of each of the press wheel units is connected with a rigid portion of the frame, with cushion means connected between the other end of each press wheel unit and the frame, thus providing a flexible arrangement for the press wheels with a minimum number of parts and maximum simplicity. Particularly, it is one feature of this invention to provide means whereby one end of the axle shaft of each press wheel unit is journaled by swiveled means on a rigid portion of the frame, with the other end of the shaft similarly connected to a swingable part of the frame, the swinging motion of which is spring biased so as to support its portion of the weight of the drill while accommodating irregular ground surface.

These and other objects and advantages of the present invention will be apparent to those skilled in the art after a consideration of the following detailed description, taken in conjunction with the accompanying drawing in which the preferred form of the invention has been illustrated.

In the drawing:

Figure 1 is a perspective view of the frame of a grain drill in which the principles of the present invention have been incorporated;

Figure 2 is a rear view of the grain drill, showing the press wheel units in an angled position, accommodating the passage of the grain drill over a depression in the ground surface; and Figure 3 is an enlarged side view of one of the journal boxes for the press wheel units.

Referring now to the drawing, the reference numeral 1 indicates the grain drill in its entirety, which includes a grain box 2 supported by means of brackets 3 on a frame which is indicated in its entirety by the reference numeral 4. Press wheel units 5 and 6 are connected with the frame 4 means which will be described below.

The frame 4 of the grain drill preferably is made up of suitable angle irons, as is more or less conventional in this type of implement. The front bar 8 is substantially U-shaped in formation, including a front section 9 and side sections 10 and 11, which form the ends of the frame 4 since the latter is generally transversely disposed. The rear ends of the side frame bars 10 and 11 are connected together by a rear bar 12 suitably bolted thereto, as at 14 and 15. An intermediate bar 17 is disposed transversely and is connected at its ends with the side bar sections 10 and 11. A pair of draw angles 18 and 19 are connected by brackets 20 and 21 to the front bar 9 and to the intermediate bar by bolts 22. The front ends of the draw angles 18 and 19 converge forwardly and are adapted to be connected to suitable hitch means (not shown), which may take the form of a front truck upon which the front end of the drill may be carried. The frame 4 also includes a longitudinally disposed center bar 24 which is connected at its forward end to the front bar 9 and at its rear end to the rear cross bar 12.

Each of the press wheel units 5 and 6 includes a plurality of press wheels 27 mounted on an axle shaft 28. The press wheels may be secured directly to the axle shaft 28 or they may be rotatable thereon, as desired. The laterally outer end, indicated at 29, of each axle shaft 28 extends laterally outwardly beyond the outermost wheel 27 and is adapted to be journaled for rotation in an axle box 31 which is flanged, as at 32, and has a generally cylindrical central section 33 that is provided with oppositely disposed trunnions 34 projecting fore and aft from the upper portion of the cylindrical section 33. A similar axle box 31a is disposed about the laterally inner end portion of the axle shaft 28 between the two laterally inner wheels 27, as best shown in Figure 2. The laterally outer end 29 of the left hand press wheel unit 5 is extended laterally outwardly a distance sufficient to receive a sprocket 37 about which a chain 38 is trained. The upper portion of the chain is trained around a driving sprocket gear 39 which drives the seeding mechanism of the drill, indicated by the reference numeral 40.

Each of the press wheel units 5 and 6 is connected with the frame 4 so that one end is held against generally vertical movement while the other is connected by means that provides for generally vertical movement, which latter movement is cushioned, whereby the press wheels are permitted to follow the contour of the ground while sustaining the desired proportion of the weight of the implement and bearing with uniform pressure against the soil immediately over the deposited seed.

Referring now more particularly to Figure 1, at each end of the transverse frame 4, a press wheel drawbar is rigidly connected. The drawbar for the left side of the frame is indicated by the reference numeral 45 and the drawbar for the right side of the machine is indicated by the reference numeral 46. These drawbars 45 and 46 extend longitudinally rearwardly and downwardly, and at their upper ends each is connected to a clip or bracket 47 that is secured by any suitable means, such as a bolt or rivet, to the cross bar 17. Rearwardly of its forward end, each of the drawbars 45 annd 46 is apertured to receive a bolt 48 by which the lower ends of a pair of downwardly converging braces 51 and 52 are connected. The upper end of the outer brace 51 is secured by a bolt 54 to the rear end of the associated side frame bar. The upper end of each of the laterally inner braces 52 is secured to the associated end portion of the cross bar 12 by a bolt 55. From the above it will be seen that each of the drawbars 45 and 46 serves as a rigid section of the frame 4 extending generally downwardly and rearwardly at each side or end of the frame. A pair of similar bars 61 and 62 are pivoted, as at 63 and 64, to clips 66 and 67 that are fixed to the intermediate portion of the intermediate cross bar 17. The drawbars 61 and 62 extend generally rearwardly and downwardly in substantially the same direction as the laterally outer rigid drawbars 45 and 46. A pair of clips 69 are secured, as by a bolt 71, to each of the pivoted or swingably mounted drawbars 61 and 62 and are apertured to receive a pivot pin 72 by which the lower end of a rod 74 is connected therewith. The upper end of each of the rods 74 extends through the laterally rearwardly directed portion of a bracket 76 which is bolted or otherwise secured to the vertical flange of the rear angle bar 12. A spring 78 surrounds each rod 74 and bears at its upper end against the associated bracket 76 and at its lower end against an adjusting nut 79 threaded on the lower end of the rod 74. For connecting the axle boxes 31 to the rear end of each of the drawbars 45, 46, 61 and 62, the rear end of each of the bars is provided with a pair of apertures to receive bolts 81 and 82 by which a pair of U-shaped clamps or yokes 83 and 84 are secured in place in depending relation. The loop portions of the clamps or yokes 83 and 84 receive the fore and aft directed trunnions 34 on the axle boxes 31, and, as best shown in Figure 2, the cylindrical portions of the axle boxes 31 receive the axle shafts 28 for accommodating its rotation therein. The yokes 83 and 84 accommodate the swinging of the associated axle boxes 31 about axes defined by the trunnions 34 in order to permit the press wheel units taking angled position, as shown in Figure 2. Each axle shaft 28 is held in position in the laterally outer axle box 31 by means of a cotter 87 at the laterally outer side of the axle box and the laterally outer wheel 27 which is fixed to the shaft 28 at the laterally inner side of the laterally outer axle box 31, as best shown in Figure 2. Since the associated frame bar, 45 or 46, is connected in laterally rigid relation with and forms a part of the frame 4, it will be seen that the lateral positions of the press wheels 5 and 6 are thus determined.

In normal operation, the adjusting nuts 79 are adjusted until the press wheel units are substantially level but with the press wheels bearing against the ground with substantially equal pressure, as shown in dotted lines in Figure 2. A portion of the weight of the implement is transmitted by the rigid bars 45 and 46 to the laterally outer ends of the press wheel units while other portions of the weight of the implement is transmitted by the springs 78 to the laterally inner swingable bars 61 and 62, to which the laterally inner ends of the press wheel units are connected. By virtue of this construction, the laterally outer ends of the press wheel units are held against vertical displacement, but relatively free vertical swinging movement of the inner ends of the press wheel units is permitted, being cushioned by the springs 78 so that, when the drill passes over uneven ground, such as is indicated in Figure 2, the press wheel units are permitted to take angled positions so as to sustain the weight of the implement and bear with substantial uniformity, yet with the wheels accommodating the ground contour. The downward movement of the laterally inner ends of the press wheel units 5 and 6 may be limited by cotters 90 passed through openings in the upper ends of the rods 74.

If desired, the forward yokes 83 at the rear ends of the press wheel drawbars 45, 46 and 61, 62 may be riveted in place, instead of being bolted, but it is preferable to have the rear yokes 84 bolted so that in assembling the machine, the press wheel units may be moved into place with the forward trunnions 34 resting in the forward yokes 83, whereupon the rear yokes 84 may then be bolted in position, which then holds the press wheel units in place.

While I have shown and described above the preferred structure in which the principles of the present invention may be incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a grain drill of the press wheel type, a frame, a pair of downwardly and rearwardly extending laterally outer frame bars rigidly fixed to the lateral end portions of said frame, a pair of downwardly and rearwardly extending laterally inner frame bars disposed adjacent one another and pivotally connected at their forward ends with the intermediate portion of said frame for independent limited lateral movement relative thereto, spring means connected between said frame and each pivoted frame bar for yieldingly resisting upward movement thereof and accommodating said limited lateral movement of the laterally inner bars, and a pair of press wheel units, each connected at one end with one of the rigid frame bars and at the other end with the associated pivoted frame bar, whereby the laterally inner ends of said press wheel units are free to move upwardly and downwardly independently of one another, relative to the outer ends for accommodating passage of the drill over uneven ground.

2. In a grain drill, a main frame, a frame bar at each side of the frame, each secured at its upper and forward end to said frame and extending downwardly and rearwardly beyond the rear side of said frame, vertically extending laterally rigid brace means connected at its lower end to the intermediate portion of each bar and at its upper end with the frame for holding the bar laterally rigid, a pair of gangs of press wheels, each gang having an axle shaft upon which the wheels are mounted, a pair of intermediate frame bars pivotally connected at their upper ends with said frame for limited lateral movement and extending generally downwardly and rearwardly, bearing means rotatably connecting the end portions of each axle shaft with the associated laterally rigid frame bar and the associated pivotally mounted frame bar and holding the axle shaft and bar against relative lateral displacement, and spring means reacting against the frame and the pivotally mounted frame bars, whereby said press wheel gangs are capable of independent swinging movement at their laterally inner ends to accommodate uneven ground.

3. In a grain drill, a frame, at least two pairs of generally rearwardly extending frame bars, means rigidly connecting one frame bar of each pair with the frame so as to hold said bar of each pair rigidly with respect to said frame, means swingably connecting the other bar of each pair with said frame, the swingable connecting means for one bar being movable independently of the swingable connecting means of the other bar, whereby said bars are independently swingable, and a gang of press wheels carried by each pair of frame bars, each of said gangs being swingable generally about its connection with the rigidly held frame bar so that said wheels are adapted to follow the contour of the ground.

4. The invention set forth in claim 3, further characterized by seeding means carried on said frame, and means for driving said seeding means connected with one of said gangs at a point adjacent the associated rigid frame section.

5. A grain drill comprising a frame, including adjacent one side a generally downwardly and rearwardly extending section rigidly associated with the frame, a swingable member pivotally connected at its upper and forward end with the frame, a press wheel unit connected at one end with said section and at the other end with said member spring means reacting against the associated swingable member, whereby upward movement of one end of said press wheel unit is yieldingly resisted, seeding means carried on said frame and including a drive gear at one end thereof, a sprocket connected with one end of said press wheel unit for rotation therewith, said sprocket being disposed adjacent the associated rigid section of said frame, and a sprocket chain connecting said sprocket with said seeding drive gear.

WILLIAM A. HYLAND.